United States Patent [19]

Johnson et al.

[11] 4,265,099
[45] May 5, 1981

[54] FLEXIBLE COUPLING

[75] Inventors: Kenneth O. Johnson; Harold E. Fogg, both of Cincinnati; Ned A. Hope, Loveland, all of Ohio

[73] Assignee: General Electric Company, Cincinnati, Ohio

[21] Appl. No.: 16,850

[22] Filed: Mar. 2, 1979

[51] Int. Cl.³ .............................................. F16D 3/78
[52] U.S. Cl. ........................................... 64/13; 64/8; 64/11 R; 64/15 R
[58] Field of Search ............. 64/13, 15 R, 15 B, 11 R, 64/11 B, 8

[56] References Cited

U.S. PATENT DOCUMENTS

| | | | |
|---|---|---|---|
| 1,343,121 | 6/1920 | Francke | 64/15 B |
| 1,582,284 | 4/1926 | Leipert | 64/13 X |
| 1,636,389 | 7/1927 | Simms | 64/13 |
| 1,639,644 | 8/1927 | Baumann | 64/11 R |
| 1,795,765 | 3/1931 | Dickerson | 64/13 X |
| 2,647,380 | 8/1953 | Troeger et al. | 64/13 |
| 2,883,839 | 4/1959 | Troeger et al. | 64/13 |
| 2,997,863 | 8/1961 | Stone et al. | 64/13 |
| 3,124,942 | 3/1964 | Rothfuss et al. | 64/13 |
| 3,500,658 | 3/1970 | Goody | 64/13 |
| 3,621,674 | 11/1971 | Ulics et al. | 64/11 B |
| 4,027,502 | 6/1977 | Stuemky | 64/8 |
| 4,175,406 | 11/1979 | Downey | 64/13 |
| 4,191,030 | 3/1980 | Culistrat | 64/15 B |

FOREIGN PATENT DOCUMENTS

| | | | |
|---|---|---|---|
| 870914 | 6/1961 | United Kingdom | 64/13 |
| 924796 | 5/1963 | United Kingdom | 64/13 |
| 1091121 | 11/1967 | United Kingdom | 64/13 |
| 1397819 | 6/1975 | United Kingdom | 64/13 |

Primary Examiner—Henry K. Artis
Attorney, Agent, or Firm—Donald W. Walk; Derek P. Lawrence

[57] ABSTRACT

An improved flexible coupling for use in conjunction with a flexible high speed coupling shaft includes means for increasing the coupling axial stiffness while maintaining a high degree of alignment offset capability and the same overall shaft axial stiffness.

4 Claims, 7 Drawing Figures

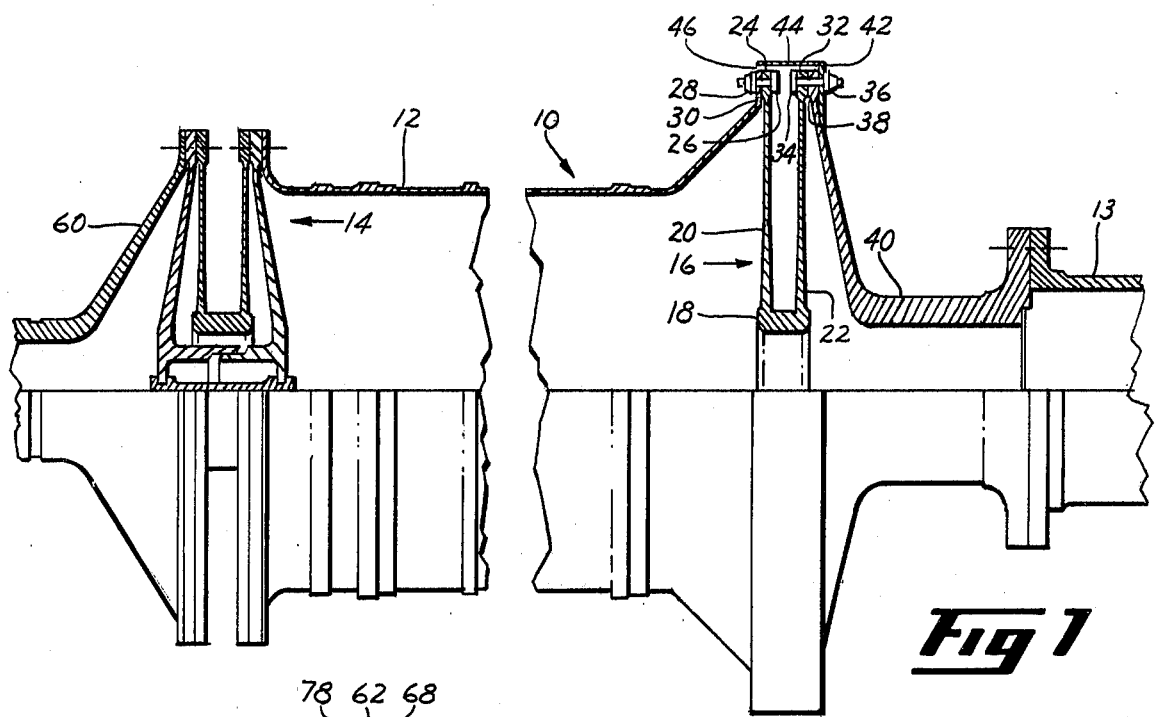
*Fig 1*
*Fig 2*
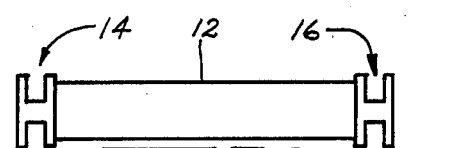
*Fig 3A*
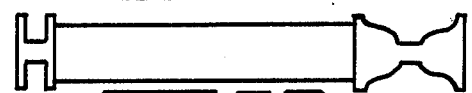
*Fig 3B*
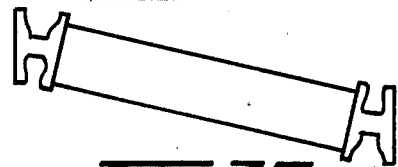
*Fig 3C*
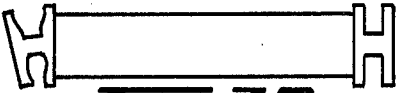
*Fig 3D*
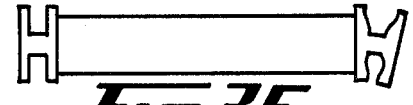
*Fig 3E*

FLEXIBLE COUPLING

BACKGROUND OF THE INVENTION

1. Field of the Invention

This invention relates generally to flexible couplings and, more particularly, to an improved flexible coupling for transmitting torque from a driving member to a driven member.

2. Description of the Prior Art

A flexible high speed coupling shaft is often employed in conjunction with a propulsion system to transmit shaft torque to a load. For example, such a shaft may be employed in conjunction with the power turbine of a marine or industrial gas turbine engine to transmit torque such as to a ship's propeller reduction gearing or to the impeller shaft of a pump. A flexible high speed coupling shaft is advantageous in such instances because it compensates for axial, parallel offset and angular propulsion system/reduction gear positioning misalignments while transmitting the shaft torque to the load and limiting the axial load to be compatible with the anti-friction thrust bearings.

One such prior art flexible high speed coupling shaft which is currently utilized in conjunction with a marine gas turbine propulsion system is comprised of a distance piece supported at its forward or driving end by a dual disc flexible coupling which is attached to a driving member. The aft or driven end of the distance piece is supported by a second dual disc flexible coupling which, in turn, is attached to a driven member. A piston ring damper assembly is connected to the aft flexible coupling to dampen axial deflections and antideflection rings are positioned circumferentially about each of the couplings to limit deflections due to radial impact loads. The axial resonance frequency of such a flexible high speed coupling shaft spring/mass system is a function of the coupling axial spring rates and the coupling supported weight of the distance piece and is generally in the 18 to 25 Hz range.

Although the above-described flexible high speed coupling shaft performs satisfactorily with current ocean-going vessels, it was found to be unacceptable for use in vessels designed to operate primarily in shallow waters. Such shallow water vessels generally have smaller diameter propellers with higher screw-turning speeds than those of the ocean-going vessels. The smaller, faster propellers result in blade passing frequencies which approach and fall within the critical axial resonance frequency range of the prior art flexible high speed coupling shaft spring/mass system. In addition, it was found that the prior art piston ring axial deflection damper assembly is subjected to wear, which may eventually cause it to become ineffective.

It is, therefore, an object of the present invention to provide an improved flexible coupling which raises the axial resonance frequency of a flexible high speed coupling shaft.

It is a further object of the present invention to provide such a flexible coupling which maintains a high degree of torque carrying and alignment offset capability.

It is another object of the present invention to provide such a flexible coupling which eliminates the need for an axial deflection damper assembly.

It is yet another object of the present invention to provide such a flexible coupling which includes a radial snubber feature to limit radial deflections of the shaft.

SUMMARY OF THE INVENTION

Briefly stated, these objects, as well as additional objects and advantages which will become apparent from the following detailed description and the appended drawing and claims, are accomplished by the present invention which, in one form, provides an improved flexible coupling comprising first and second diaphragm members with an annular flexible coupling member between them. The flexible coupling member includes a pair of radially extending discs. The first disc is connected to the first diaphragm member and the second disc is connected to the second diaphragm member. The improvement is provided through a means which may be, for example, a tie-bolt, for increasing the axial stiffness of the flexible coupling while maintaining alignment offset capability.

BRIEF DESCRIPTION OF THE DRAWING

FIG. 1 is a schematic view of a flexible high speed coupling shaft which includes, in one form, the present invention.

FIG. 2 is an enlarged view of the forward end of the shaft depicted in FIG. 1.

FIGS. 3A–E is a series of characterizations of various misalignments of the shaft depicted in FIG. 1.

DESCRIPTION OF THE PREFERRED EMBODIMENT

Referring to the drawing, wherein like numerals correspond to like elements throughout, attention is first directed to FIG. 1 wherein is depicted a drive shaft or flexible high speed coupling shaft, shown generally as 10, which includes in one form, the present invention. The shaft 10 is employed in this embodiment to transmit torque from the power turbine output shaft through forward adapter member 60 of a marine-type gas turbine engine (not shown) to the propeller shaft reduction gearing of a shallow water vessel (not shown) through member 13. It should be understood, however, that the above-described specific use of the shaft in this embodiment is not intended as a limitation upon the present invention which could be employed equally as well in conjunction with any other suitable application or with any other suitable type of propulsion system, for example a diesel engine, or in conjunction with any other suitable end application, for example to provide torque to the impeller shaft of a pump.

The shaft 10 is comprised of an annular distance piece 12 which is supported at its forward and aft ends by flexible couplings 14 and 16, respectively. (As used herein forward shall mean toward the left and aft shall mean toward the right as viewed in the figures.)

The aft flexible coupling 16, which is typical of the prior art dual disc flexible couplings described above, is comprised of a flexible coupling member 18 which includes a pair of annular discs 20 and 22 extending radially outwardly therefrom. An annular flange 24 at the radially outer end of the first disc 20 is connected by means of a plurality of bolts and locknuts 26 and 28, respectively (only one pair of which is shown for purposes of clarity) to a radially oriented annular flange 30 at the aft end of the distance piece 12. In a similar manner, an annular flange 32 at the radially outer end of the second disc 22 is likewise connected by means of a plurality of bolts and locknuts 34 and 36, respectively (again only one pair of which is shown) to a radially oriented annular flange 38 at the forward end of an annular aft adapter member 40. The aft adapter member 40 in turn is connected through member 13 to the vessel's propeller reduction gearing (not shown).

An annular anti-deflection ring 42 is also connected to the aft adapter member 40 by bolts 34 and locknuts 36. The anti-deflection ring 42 includes an annular lip portion 44 which extends axially forward from the aft adapter member 40 along the radially outer ends of the distance piece flange 30 and the aft coupling disc flanges 24 and 32. A small annular gap 46 of a predetermined size is maintained between the inner diameter of the anti-deflection ring lip portion 44 and the outer diameter of the distance piece flange 30/first coupling disc flange 24 combination. The purpose of anti-deflection ring 42 is to limit radial (or lateral) deflection of the aft end of the distance piece 12 (which may, for example, be caused by high impact radial shock loading) to the small predetermined distance of the annular gap 46. The flexible coupling 16 thus described is essentially the same as the dual disc flexible coupling of the above-described prior art high speed coupling shaft.

Referring now to FIGS. 1 and 2 there is depicted the forward flexible coupling 14 which comprises one form of the present invention. The forward flexible coupling 14 is comprised of a pair of deflection limiter diaphragm members 48 and 50. The axial thickness of the diaphragm members 48 and 50 is substantially uniform at their radial center sections and gradually decreases with increasing radial distance so that a generally uniform torsional shear stress due to shaft torque is maintained and substantially uniform axial bending stress occurs. The first or forward diaphragm member 48 includes at its radially outer end a radially oriented flange portion 52 which is connected by a plurality of bolts and locknuts (54 and 56, respectively) to a radially oriented annular flange 58 at the aft end of forward adapter member or driving member 60. The forward adapter member, in turn, is connected to the power turbine output shaft of the gas turbine engine (not shown). In a similar manner, the second or aft diaphragm member 50 includes at its radial outer end a radially oriented annular flange portion 62 which is likewise connected by a plurality of bolts and locknuts (64 and 66, respectively) to a radially oriented annular flange 68 at the forward end of the distance piece 12.

A flexible annular coupling member 70 is disposed axially between the diaphragm members 48 and 50. The coupling member 70, which is substantially the same as the aft flexible coupling member 18, includes a pair of annular discs 72 and 74 which extend radially outwardly therefrom. An annular flange 76 at the radially outer end of disc 72 is connected (by bolts and locknuts 54 and 56, respectively) to the forward diaphragm member flange portion 52 and the forward adapter member flange 58. In a similar manner, an annular flange 78 at the radially outer end of disc 74 is connected (by bolts and locknuts 64 and 66, respectively) to the aft diaphragm flange portion 62 and the forward distance piece flange 68.

In order to raise the axial resonance frequency of the flexible high speed coupling shaft 10 it is necessary to increase the axial stiffness of the flexible coupling 14. This objective is accomplished by means 80, comprising in this embodiment a tie-bolt, for maintaining an essentially constant axial distance between the radial centers of the diaphragm members 48 and 50. The tie-bolt 80 includes a pair of annular bosses 82 and 84 which abut the radial centers of the diaphragm members 48 and 50 to prevent them from axially converging. The tie-bolt 80 also includes a reduced diameter threaded shank on each end 86 and 88. The threaded tie-bolt shanks 86 and 88 extend respectively through appropriately sized axially oriented openings 90 and 92 at the radial centers of the diaphragm members 48 and 50. Means, for example locknuts 94 and 96, are installed and tightened on the tie-bolt shanks 86 and 88 in order to prevent the radial centers of the diaphragm members 48 and 50 from axially diverging. Thus, the tie-bolt 80 acts to restrain the forward flexible coupling 14 from any axial deflection in order to increase the axial stiffness of the flexible coupling 14 while maintaining a high degree of alignment offset capability (as is hereinafter described).

Shaft torque is transmitted through the forward flexible coupling 14 along the load path from the forward outer diameter bolts 54 with a torque split between the flexible coupling member 70 and the diaphragm members (48 and 50)/tie bolt (80) assembly and back to the aft outer diameter bolts 64. The ratio of the split in torque between the flexible coupling member 70 and the diaphragm members/tie-bolt assembly is a function of the flexible coupling member to tie-bolt torsional flexibility. (Torsional flexibility is a function of the axial length of a member over its cross-sectional diameter and is measured in units of rad/ft-lb.) Since the axial length of the tie-bolt 80 is large relative to that of the flexible coupling member 70 (approximately 3:1) and the tie-bolt 80 diameter is small relative to that of the flexible coupling member 70 (approximately 1:4) the tie-bolt 80 has a much greater torsional flexibility than the flexible coupling member 70. Therefore, practically all of the shaft torque is transmitted through the flexible coupling member 70.

The flexible high speed coupling shaft 10 also has the ability to compensate for axial, parallel offset and angular misalignments while transmitting the shaft torque loads. Referring now to FIG. 3, there is depicted a characterization of how the shaft 10 accepts the various types of misalignments. FIG. 3A shows the shaft 10 when there is perfect alignment between the gas turbine engine (propulsion system) and the reduction gear. FIG. 3B depicts a pure axial misalignment situation in which the forward flexible coupling 14 is restrained from any axial deflection, thereby the entire axial misalignment is transmitted to the flexure of the aft flexible coupling 16. FIG. 3C shows the result of a parallel offset misalignment. The results of propulsion system angular misalignment and reduction gear misalignment are shown in FIGS. 3D and 3E, respectively. Combinations of the various types of misalignments, for example a propulsion system angular misalignment in combination with a reduction gear parallel offset misalignment, are compensated for in a similar manner.

Referring again to FIGS. 1 and 2, the forward diaphragm member 48 includes a cylinder-like annular flange 98 which extends axially aft to surround a portion of the tie-bolt 80. For purposes which will hereinafter become apparent, a portion of the aft end of flange 98 has a reduced inner diameter 100.

In a similar manner, the aft diaphragm member 50 includes a cylinder-like annular flange 102 having substantially the same diameter as that of flange 98 but which extends axially forward. A portion of the forward end of flange 102 has a reduced outer diameter 104 such that the two flanges 98 and 102 overlap. A small annular lip 106 extends radially outwardly from the axially forward end of flange 102 and engages the inner diameter of the forward diaphragm member flange 98. The contact point between the two flanges 98 and 102 is substantially midway between the two diaphragm members 48 and 50.

The purpose of the above-described diaphragm member flanges 98 and 102 is to provide a snubber feature to limit radial (lateral) deflection of the forward end of the distance piece 12. This snubber feature thus serves the same purpose as does the anti-deflection ring 42 which is associated with the aft flexible coupling 16. The radially outer surface of the annular lip 106 is rounded in order to allow for angular deflections of the flexible coupling 14 without resulting in undesired snubber contact.

From the foregoing description it can be seen that the present invention comprises a flexible coupling for a high speed flexible coupling shaft which effectively raises the axial resonance frequency of the shaft while maintaining the torque carrying and alignment offset capabilities of the shaft. It will be recognized by those skilled in the art that changes may be made to the above-described invention without departing from the broad inventive concepts thereof. For example, the forward flexible coupling 14 and the aft flexible coupling 16 may be reversed. It is to be understood, therefore, that this invention is not limited to the particular embodiment disclosed, but it is intended to cover all modifications which are within the spirit and scope of the appended claims.

What is claimed is:

1. An improved drive shaft including a driving member and driven member, an improved flexible coupling for transmitting torque from the driving member to the driven member comprising:
    a first diaphragm member which is connected to the driving member;
    a second diaphragm member which is connected to the driven member; and
    an annular flexible coupling member disposed axially between the diaphragm members, said coupling member including first and second radially extending discs, the first disc being connected to the first diaphragm member and the second disc being connected to the second diaphragm member, wherein the improvement comprises means for increasing the axial stiffness of the flexible coupling while maintaining alignment offset capability,
    wherein the means is comprised of a tie-bolt extending through the radial center of each of the diaphragm members, said tie-bolt including a pair of bosses thereon to prevent the radial centers of the diaphragm members from axially converging and means for securing each axial end thereof to the diaphragm members in order to prevent the radial centers of the diaphragm members from axially diverging.

2. An improved flexible coupling comprising:
    first and second diaphragm members;
    an annular flexible coupling member disposed axially between the diaphragm members, said coupling member and including first and second radially extending discs, the first disc being connected to the first diaphragm member and the second disc being connected to the second diaphragm member; and
    means for increasing the axial stiffness of the flexible coupling while maintaining alignment offset capability,
    wherein the means is comprised of a tie-bolt extending through the radial center of each of the diaphragm members, said tie-bolt including a pair of bosses thereon to prevent the radial centers of the diaphragm members from axially converging and means for securing each axial end thereof to the diaphragm members in order to prevent the radial centers of the diaphragm members from axially diverging.

3. The improved flexible coupling as recited in claims 1 or 2 wherein:
    the first diaphragm member includes a first annular flange extending axially therefrom;
    the second diaphragm member includes a second annular flange extending axially therefrom; and
    said flanges overlap and engage each other at an axial location which is substantially midway between the diaphragm members.

4. The improved flexible coupling as recited in claim 3 wherein one of said flanges includes a rounded surface at its contact point with the other flange.

* * * * *